July 11, 1939.   E. E. LLOYD   2,165,865
TRACTION TIRE CHAIN
Filed May 11, 1936

INVENTOR,
Eldon E. Lloyd.
BY
ATTORNEYS.

Patented July 11, 1939

2,165,865

UNITED STATES PATENT OFFICE 2,165,865

TRACTION TIRE CHAIN

Eldon E. Lloyd, Maryville, Mo.

Application May 11, 1936, Serial No. 79,061

2 Claims. (Cl. 152—239)

This invention relates to traction tire chains particularly suited for use where the vehicle is to be used on relatively soft ground.

The principal object of this invention is the provision of a tire chain having a series of relatively broad, transverse tread members consisting of fabricated parts to form a web mesh suitable for contacting a large area of ground to facilitate traction.

A further object of this invention is the provision of a traction chain comprising spaced-apart rim chains carrying tread units each consisting of spaced-apart, substantially parallel cross chains interconnected by a plurality of links.

Other objects are simplicity and economy of construction and efficiency of operation.

With these objects in view, together with minor objects which will appear during the course of the specification, reference will now be had to the drawing, wherein.

Figure 1:
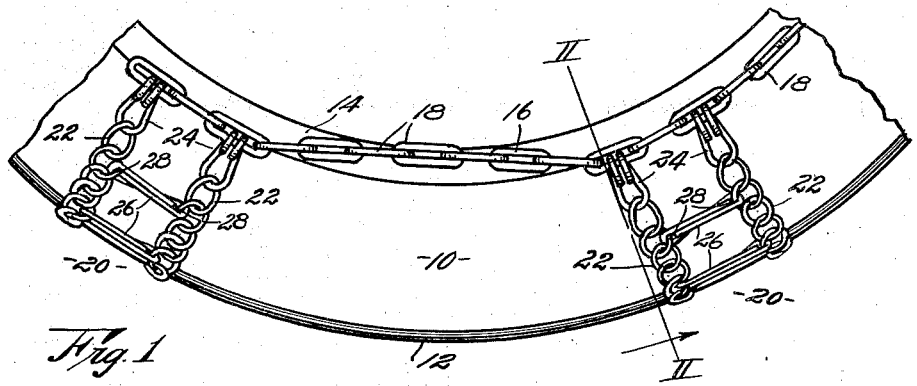
Figure 1 is a side elevation of a portion of a vehicle tire, with a segment of a traction chain mounted thereon embodying this invention.

Throughout the several views of the drawing, like reference characters refer to similar parts, and the numeral 10 designates a vehicle tire of the ordinary pneumatic type having tread portion 12 and a rim portion 14. The tread portion of the tire is usually molded in certain designs to facilitate traction, thereby causing depression in the tread, into which the single strand cross chain might become lodged to eliminate, to a certain degree, its usefulness as a traction element. The broad cross tread unit of the present invention, as hereinafter set forth, overcomes this defect, due to the fact that it spans a relatively broad area of the tread.

Figure 2:
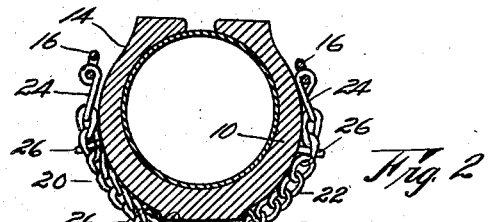
Fig. 2 is an enlarged, cross sectional view taken on line II—II of Fig. 1.

The traction tread member or chain comprises spaced-apart rim chains 16, made of a series of links 18. These rims chains are adapted to be positioned adjacent the tire rim at opposite sides thereof as shown in Fig. 2. Interconnecting these rim chains, preferably at regular intervals, is a cross tread unit or chain 20, each comprising parallel cross chains 22, spaced-apart and secured at their opposite ends to rim chains 16 by means of link hooks 24. The shape of the cross members is not necessarily just as shown, since it is only necessary that they be pliant and capable to offer resistance to facilitate traction. The number of cross chains to each unit might be varied to produce a cross traction unit of any desired width.

Cross chains 22 are interconnected by means of members 26 which are adapted to engage corresponding links of the cross chains and extend substantially parallel with the rim chains. These links or members 26 may be made of a section of chain or any other pliant structure suitable for maintaining the cross chains in a predetermined relation.

The links as shown are made of wire rebent upon itself to form an eyelet 28 at each end thereof, through which the strand of the cross chain links pass. With this type of structure of interconnecting member, no buckling of the member 26 can occur to cause relative displacement of the cross chains. It will be observed that these connecting members are so positioned as to contact the side walls of the tire, but not to interfere with the tread portion thereof. Should it be deemed advisable to use this type of traction chain on a double-tired vehicle wheel, the same general principal might be maintained to provide connecting members positioned at the zones other than those at the tread portions of the tires.

When so constructed, the cross chains function to contact the ground in a predetermined relative relation and will function to facilitate very definite and perfect traction. That portion of the cross units extending over the tread portion of the tire which is free from interconnecting links, will have sufficient movement relative to the tire tread to eliminate any earth or trash that may have accumulated thereon.

Figures 3, 4, 5:
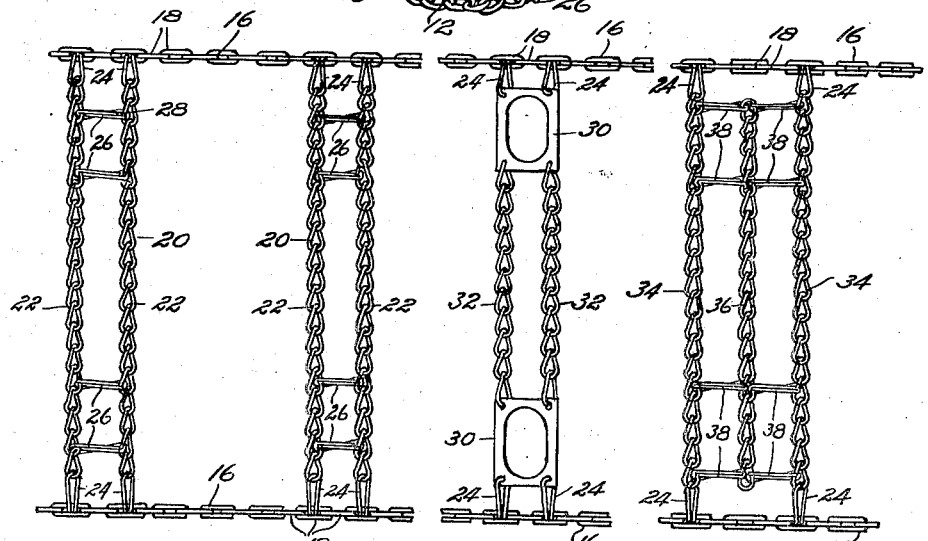
Fig. 3 is a stretch-out view of a portion of the traction chain.
Fig. 4 is a stretch-out view of a modified form of the traction chain, in which a formed plate is substituted for certain of the chain links in the tread member, and, Fig. 5 is a stretch-out of a modified form, wherein the fabricated tread unit is provided with an intermediate cross chain.

Referring now to Fig. 4 which shows a slight modification, it will be noted that the link hooks 24 engage one end of plate 30, while cross chains 32 extend between and are attached to plates 30, thereby producing a cross tread unit similar to that shown in Fig. 3. Plate 30 is preferably of spider form and serves to maintain the cross chains 32 in proper traction relation. In case of extremely large tires, more than one of these plates 30 might be used at each side of the center or tread portion.

Fig. 5 provides for two parallel cross chains 34 which are interconnected with the spaced-apart rim chains 16 by means of link hooks 24. Positioned between and parallel with cross chains 34, is an intermediate chain 36, which is interconnected with the cross chain by means of connecting links 38. The extremities of this intermediate chain 36 are preferably not attached to the rim chains 16, thereby allowing more flexing of the traction unit as a whole. This particular type of traction unit is suitable for use with exceptionally large tires and also where the soil is relatively loose.

What I claim as new and desire to secure by Letters Patent is:

1. A traction chain for vehicle tires comprising spaced-apart rim chains; spaced-apart cross tread units interconnecting said rim chains, each tread unit consisting of spaced-apart, substantially parallel cross chains interconnecting said rim chains; an elongated pliant member positioned intermediate said cross chains and spaced apart from said rim chains; and a plurality of substantially parallel members connecting the end portions of said pliant member with the adjacent cross chains respectively, whereby the major central portions of the cross chains and pliant member are free for independent transverse movement.

2. A traction chain for vehicle tires comprising spaced apart rim chains; spaced apart cross tread units interconnecting said tread units, consisting of a pair of spaced apart substantially parallel cross chains interconnecting said rim chains; an elongated pliant member positioned intermediate said cross chains and substantially parallel therewith, with its end extremities respectively spaced apart from the adjacent rim chains; and links interconnecting the end portions of said pliant member with the major central portion of said pliant member, which spans the normal contacting tread of the tire, free for transverse movement independent of the central portion of the adjacent cross chains.

ELDON E. LLOYD.